United States Patent [19]

Coman et al.

[11] 4,171,638
[45] Oct. 23, 1979

[54] SYSTEM FOR MEASURING PULSATING FLUID FLOW

[75] Inventors: William E. Coman, Newport; Stanley T. Ciolek, New Hartford, both of N.Y.

[73] Assignee: The Bendix Corporation, Teterboro, N.J.

[21] Appl. No.: 929,868

[22] Filed: Jul. 31, 1978

[51] Int. Cl.² .............................................. G01F 9/00
[52] U.S. Cl. ..................................... 73/119 A; 73/168
[58] Field of Search ........................ 73/3, 119 A, 168

[56] References Cited
U.S. PATENT DOCUMENTS

| | | | |
|---|---|---|---|
| 2,826,067 | 3/1958 | Braunlich | 73/168 |
| 3,374,667 | 3/1968 | Mayer | 73/119 |
| 3,839,627 | 10/1974 | Grant et al. | 73/119 |
| 4,088,012 | 5/1978 | Emerson | 73/119 |

*Primary Examiner*—Herbert Goldstein
*Attorney, Agent, or Firm*—Anthony F. Cuoco; William F. Thornton

[57] ABSTRACT

A system for precisely measuring the amount of fluid discharged by a pulsating fluid flow device such as a pump, or the like. The discharged fluid is collected in a container and the amount collected is sensed by a transducer which provides a corresponding signal. The signal is processed for determining the amount of fluid collected for a predetermined number of fluid flow pulses and for automatically starting and stopping measuring cycles. The arrangement is such that continuously updated measurements are provided and are entrained in the collecting container has no effect on the measurements.

5 Claims, 1 Drawing Figure

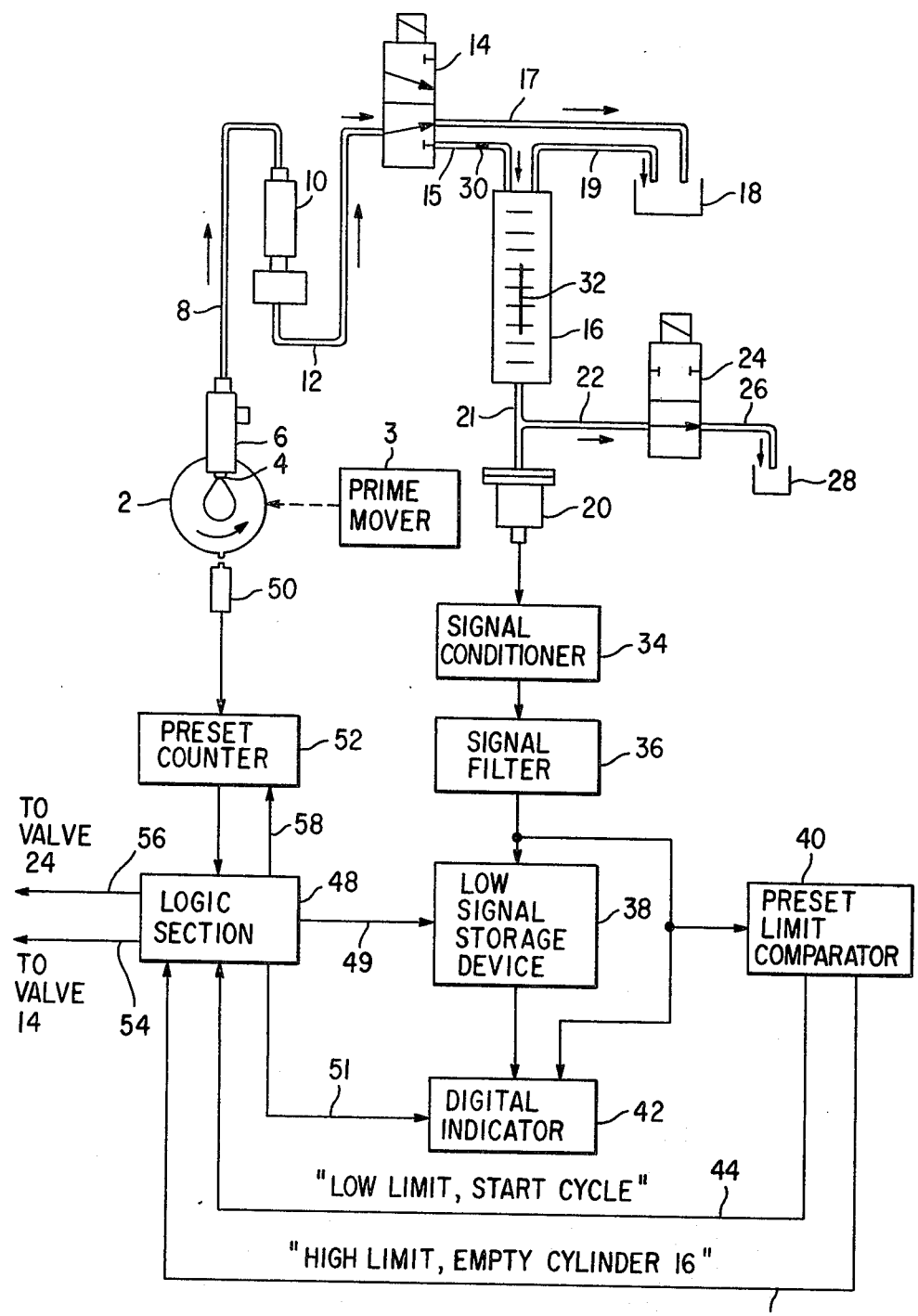

SYSTEM FOR MEASURING PULSATING FLUID FLOW

FIELD OF THE INVENTION

This invention relates generally to systems for measuring pulsating fluid flow and, particularly, to systems of the type described which measure pulsating fluid flow with a high degree of precision. More particularly, this invention relates to a system of the type described wherein measuring cycles are repeated automatically to provide a continuously updated measurement.

DESCRIPTION OF THE PRIOR ART

Fluid flow such as, for purposes of illustration, fuel flow from a unit type diesel engine fuel injection pump, must be accurately calibrated so that each pump delivers a precisely metered flow of fuel to its associated engine cylinder for the engine to run smoothly and efficiently. Engine requirements are such that the fuel must be pumped over short intervals on the combustion stroke of the engine cycle, with no flow during the remainder of the cycle. The pump flow therefore pulsates at a high frequency which has led to difficulties in making precise flow measurements.

Prior art measuring systems for the purposes described use a calibrated cylinder or graduate to collect the fuel for a given number of pump strokes as measured by a counter. Entrained air in the cylinder is allowed to settle and the amount of fuel collected is thereupon read. This is time consuming because many readings may be required in the process of adjusting the pump to a precise setting as is required. The measuring system herein described provides flow measurements which are automatically repeated, are highly accurate and are not affected by entrained air as are the measurements provided by the prior art systems.

SUMMARY OF THE INVENTION

This invention contemplates a system for measuring pulsating fluid flow and includes means for collecting the fluid and a transducer arranged with the collecting means and responsive to the amount of fluid collected for providing a corresponding signal. Assuming that the collecting means is not initially full, as the amount of collected fluid builds up, the signal increases. At the start of the measuring cycle the signal is stored and a preset counter starts counting the number of fluid flow pulses. When the count reaches a predetermined value, a logic control signal actuates means for providing a signal corresponding to the difference between the stored signal and an instantaneous fluid flow signal. The measuring cycle repeats automatically until the collecting means fills to a predetermined high limit, at which time a logic control signal actuates valves to inhibit fluid flow and to drain the collecting means, with the measurement from the last complete measuring cycle being stored to provide a starting point for another cycle which is initiated by a logic control signal actuating the valves to permit fluid flow when the fluid in the collecting means is at a predetermined low limit. In this manner the system automatically provides continuously updated measurements of fluid flow.

BRIEF DESCRIPTION OF THE DRAWINGS

The single FIGURE in the drawing is a schematic diagram of a system for measuring pulsating fluid flow according to the invention.

DESCRIPTION OF THE INVENTION

The system disclosed includes a cam 2 driven by a prime mover 3, which may be an electrical motor suitably coupled to the cam as is well known in the diesel fuel injection art. The cam actuates a plunger 4 in a diesel fuel injection pump 6 once each counterclockwise revolution of the cam (as shown by the arrow in the Figure). It will be understood that pump flow can be calibrated by external means (not shown) and the present invention measures the pump flow for the aforenoted calibration purposes.

Diesel fuel injection pump 6 may be, for purposes of illustration, a unit type diesel fuel injection pump such as manufactured by the Electrical Components Division of The Bendix Corporation, under the trade designation Model FA and which satisfies Society of Automotive Engineers (SAE) Specification F-1.

Fuel flow from pump 6, which by virture of the aforenoted operation of cam 2, is of a pulsating nature, is directed through a suitable conduit 8 to a nozzle 10 and therefrom through a suitable conduit 12 to a remotely controlled valve 14. Fuel from valve 14 is directed through a suitable conduit 15 to a measuring cylinder or graduate 16 or through a suitable conduit 17 to a return container 18. A suitable conduit 19 leads from cylinder 16 to container 18.

Measuring cylinder 16 may be a relatively tall and narrow glass cylinder. Valve 14 may be a commercially available three-way remotely controlled valve such as manufactured by the Skinner Electrical Valve Corporation under their trade designation LR4XX4180.

A transducer 20 is coupled to the bottom of cylinder 16 through a suitable conduit 21 and responds to the pressure head of the fuel in cylinder 16 for providing a corresponding electrical signal. A suitable conduit 22 is tapped into conduit 21 intermediate cylinder 16 and transducer 20 and leads to a valve 24 having a suitable conduit 26 leading to a return container 28.

Valve 24 may be a commercially available two-way remotely controlled valve such as manufactured by the skinner Electrical Valve Corporation under their trade designation LR1XX4180, and transducer 18 may be of a commercially available type such as manufactured by the Viatran Corporation under their trade designation, Model 319-24.

Fuel is pulsed into measuring cylinder 16 as aforenoted, with the cylinder containing a mixture of fuel, foam and entrained air. Conduit 15 has a baffle 30 disposed therein and cylinder 16 has a baffle 32 disposed therein to reduce sloshing caused by resonant pulsating of the fuel which has been found to occur. Valves 14 and 24 are operated to respectively fill and empty cylinder 16 as will be hereinafter described.

The signal from transducer 20 is applied to a signal conditioner 34. Signal conditioner 34, which may be of a commercially available type such as manufactured by Datronic Corporation under their trade designation Model 9178, conditions the signal from the transducer and provides a signal proportional to the pressure head of fuel as sensed by transducer 18. This signal is applied to a signal filter 36, which may be an integral part of the signal conditioner, for removing high frequency components of the signal such as may be caused by the pulsating fluid flow into cylinder 16.

Filter 36 provides a smoothed electrical signal which is directed to a low signal storage device 38, a preset limit comparator 40 and a digital indicator 42. Comparator 40 compares the signal from filter 38 to preset "high" and "low" limits. The comparator provides a "low limit, start measuring cycle" control signal at an output conductor 44 and a "high limit, empty cylinder 16" control signal at an output conductor 46. The control signals at output conductors 44 and 46 are applied to a logic device 48 which responds to the signals as will be hereinafter described. In this regard, comparator 40 may be of a commercially available type such as manufactured by the Datronic Corporation under their trade designation Model 9455.

Low signal storage device 38 samples and stores the signal from filter 36 upon a control signal from logic device 48 being applied over a conductor 49 leading therefrom to the storage device. In this regard, low signal storage device 38 may be of a commercially available type such as manufactured by Datronic Corporation under their trade designation Model 9272.

Digital indicator 42 displays and holds the difference between the signal from low signal storage device 38 and the instantaneous signal from signal filter 36 upon a control signal from logic device 48 being applied over a conductor 51 leading therefrom to the indicator. In this regard, digital indicator 42 may be of a commercially available type such as manufactured by the Datronic Corporation under their trade designation Model 9530.

Logic device 48 includes logic gates which can be connected as desired to establish a desired sequence of events and may be of a commercially available type such as manufactured by the Datronic Corporation under their trade designation Model 9381. Logic device 48 provides logic control signals in accordance with the purpose of the present invention.

A pick-up device 50 is associated with cam 3 and senses each revolution of the cam to provide a signal for stepping a preset counter 52. Counter 52, upon counting a predetermined number of cam revolutions, i.e., fuel flow pulses, applies a signal to logic device 48 to terminate a measuring cycle. In this regard, pick-up 50 may be of a commercially available type such as manufactured by Electro Products Laboratories, Inc., under their trade designation 3030AN, while preset counter 52 may be of a commercially available type such as manufactured by United Systems Corp., under their trade designation DIGITEK 109A.

OPERATION OF THE INVENTION

Fuel injection pump 6 provides a continuous series of fuel flow pulses. Assuming that measuring cylinder 16 is not full, the pulsating fuel flow is collected in the cylinder and as the level of fuel builds up an increasing electrical signal is developed at signal filter 36. At the start of a measuring cycle, as initiated by the signal from comparator 40 applied to logic device 48 over conductor 44, the logic device provides a control signal over an output conductor 54 to open valve 14 and applies a control signal over an output conductor 56 to close valve 24, whereupon cylinder 16 begins to fill. Timing means included in logic device 48 imposes a short delay to allow conditions to stablize, after which the signal from filter 36 is stored in low signal storage device 30 and preset counter 52 starts its count. When the count reaches a predetermined number, the control signal from logic device 48 applied over output conductor 51 causes digital indicator 42 to sense and display the difference between the stored signal and the instantaneous signal from filter 36. The displayed differential signal corresponds to the pressure head of fuel in cylinder 16 for a predetermined number of revolutions of cam 3. The digital indicator continues to display the differential signal as the next measuring cycle progresses.

The measuring cycles as aforenoted repeat automatically until measuring cylinder 16 is full. Each time low signal storage device 38 stores a signal corresponding to the starting point of the new cycle. When the measuring cylinder fills to a predetermined high limit, logic device 48 is responsive to the signal from comparator 40 applied over output conductor 46 to provide signals over conductors 54 and 56, respectively, for closing valve 14 and opening valve 24 whereby fluid flow to cylinder 16 is blocked and the cylinder empties. The digital indicator continues to hold the reading from the last cycle. During the cylinder emptying period, logic device 38 provides a control signal at an output conductor 58 which disables counter 52. Thus, in the manner described, the system provides continuously updated readings of the pulsating fuel flow.

It will be understood that the system as described is arranged so that transducer 20 responds to the pressure head of the fuel in cylinder 16. It is within the scope of the invention to utilize a transducer which would respond to the weight of the fuel in the measuring cylinder with the operation of the system being the same as heretofore described and as will now be understood by those skilled in the art.

Although, for purposes of illustration, the invention has been described in relation to a diesel fuel injection pump, the invention may be used as well with any device providing a pulsating fluid flow as will also be understood by those skilled in the art.

It will now be seen from the aforenoted description of the invention that a system for precisely measuring pulsating fluid flow has been provided. The invention is a distinct improvement over like devices in the art which suffer from the disadvantage of a multiplicity of time consuming measurements and the inaccuracies provided by entrained air in the fuel collecting container.

What is claimed is:

1. A system for measuring fluid flow from a pulsating fluid flow-device, comprising:
   means connected to the pulsating fluid flow device for collecting the fluid flowing therefrom;
   means including transducer means coupled to the collecting means and responsive to the amount of fluid collected thereby for providing a signal corresponding to the collected fluid and filter means connected to the transducer means for removing high frequency components from the signal therefrom;
   counter means coupled to the pulsating fluid flow device for counting the number of fluid flow pulses therefrom and for providing a corresponding signal;
   means including a comparator connected to the filter means for comparing the signal therefrom to predetermined "high" and "low" limits and providing a first control signal when the signal from the filter means is at the "low" limit and a second control signal when the signal from the filter means is at the "high" limit;

means coupled to the fluid collecting means for regulating fluid intake thereto and fluid outlet therefrom; and controlling means connected to the regulating means, the means for providing control signals and the counter means, and responsive to the first control signal for controlling the regulating means for regulating fluid intake to the collecting means, and responsive to the second control signal and the signal from the counter means for controlling the regulating means for regulating fluid outlet from the collecting means.

2. A system as described by claim 1, including:

signal storage means connected to the filter means and to the controlling means for storing the signal from the filter means at a predetermined "low" limit in response to a signal from the controlling means provided in response to the first control signal; and the counter means starting the counting of the fluid flow pulses upon the signal from the filter means at a predetermined "low" limit being stored.

3. A system as described by claim 2, including:

indicator means connected to the filter means, the signal storage means and the controlling means;

the indicator means providing an indication of the difference between the stored signal from the storage means and an instantaneous signal from the filter means in response to a controlling signal from the controlling means upon the counter means applying a signal corresponding to a predetermined number of fluid flow pulses to the controlling means; and the indication provided by the indicating means corresponding to the amount of fluid collected for the predetermined number of fluid flow pulses.

4. A system as described by claim 1 wherein:

the controlling means is responsive to the first control signal for controlling the regulating means to fill the fluid collecting means with fluid to a predetermined high limit, and is responsive to the second control signal and the signal from the counter means for emptying the collectng means of fluid to a predetermined low limit.

5. A system as described by claim 4, wherein:

the controlling means provides a signal for disabling the counter means when the collecting means is emptying fluid.

* * * * *